J. G. MacPHERSON.
TAXIMETER.
APPLICATION FILED JUNE 3, 1910.

1,000,276.

Patented Aug. 8, 1911.
9 SHEETS—SHEET 1.

WITNESSES
INVENTOR
John G. MacPherson

J. G. MacPHERSON.
TAXIMETER.
APPLICATION FILED JUNE 3, 1910.

1,000,276.

Patented Aug. 8, 1911.

Witnesses

Inventor
John G. MacPherson

J. G. MacPHERSON.
TAXIMETER.
APPLICATION FILED JUNE 3, 1910.

1,000,276.

Patented Aug. 8, 1911.
9 SHEETS—SHEET 3.

WITNESSES
INVENTOR

J. G. MacPHERSON.
TAXIMETER.
APPLICATION FILED JUNE 3, 1910.

1,000,276.

Patented Aug. 8, 1911.
9 SHEETS—SHEET 5.

WITNESSES
G. M. Spring
Ralph Healy

INVENTOR
J. G. MacPherson

J. G. MacPHERSON.
TAXIMETER.
APPLICATION FILED JUNE 3, 1910.

1,000,276.

Patented Aug. 8, 1911.

WITNESSES
G. M. Spring
Ralph Healy

INVENTOR
John G. MacPherson

J. G. MacPHERSON.
TAXIMETER.
APPLICATION FILED JUNE 3, 1910.

1,000,276.

Patented Aug. 8, 1911.
9 SHEETS—SHEET 7.

Fig. 16.

WITNESSES
G. M. Spring.
Ralph Healy

INVENTOR
John G. MacPherson.

UNITED STATES PATENT OFFICE.

JOHN G. MacPHERSON, OF PHILADELPHIA, PENNSYLVANIA, ASSIGNOR TO THE MacPHERSON COMPANY, INCORPORATED, A CORPORATION OF DELAWARE.

TAXIMETER.

1,000,276.        Specification of Letters Patent.     Patented Aug. 8, 1911.

Application filed June 3, 1910. Serial No. 564,881.

*To all whom it may concern:*

Be it known that I, JOHN G. MACPHERSON, a citizen of the United States, residing at Philadelphia, in the county of Philadelphia and State of Pennsylvania, have invented certain new and useful Improvements in Taximeters, of which the following is a specification, reference being had therein to the accompanying drawing.

This invention relates to improvements in taximeters, and more especially to a taximeter, having indicating mechanism or mechanisms for registering the fare, printing a receipt coupon of the fare paid by the passenger, and making a permanent record of the cash received by the chauffeur or driver, said indicating mechanism or mechanisms, being operated for "running" and "waiting" rates or for a single "flat" time rate, through the medium of the minute hand arbor of a clock, which at predetermined intervals, completes a circuit, through a step-by-step device to operate said mechanisms. The step-by-step device is employed, because it has been found by experiment that it is the most economical electrical device, in that the contact hand carried by the minute hand arbor of the clock for the instant that it engages the contact arm of the step-by-step device, causes the energization of the electrical operating devices and simultaneously the movement of the contact arm of the step-by-step device so that said contact arm is separated from the contact hand of the minute hand arbor, so that it requires the contact hand of the minute hand arbor to again catch up to and engage the contact arm of the step-by-step device before the next operation of the mechanism.

To clearly understand the mechanism for effecting the above result, attention is invited to the accompanying drawings, in which:—

Referring to the drawings:—The numeral 1 designates the base of the machine, which carries the frame-work 2, and the front 3. Mounted in the front and grounded thereto, is the clock 4, whose minute hand arbor 5, see Fig. 16, has mounted upon and rotatable with its rear end, the contact hand 6.

Figure 3:
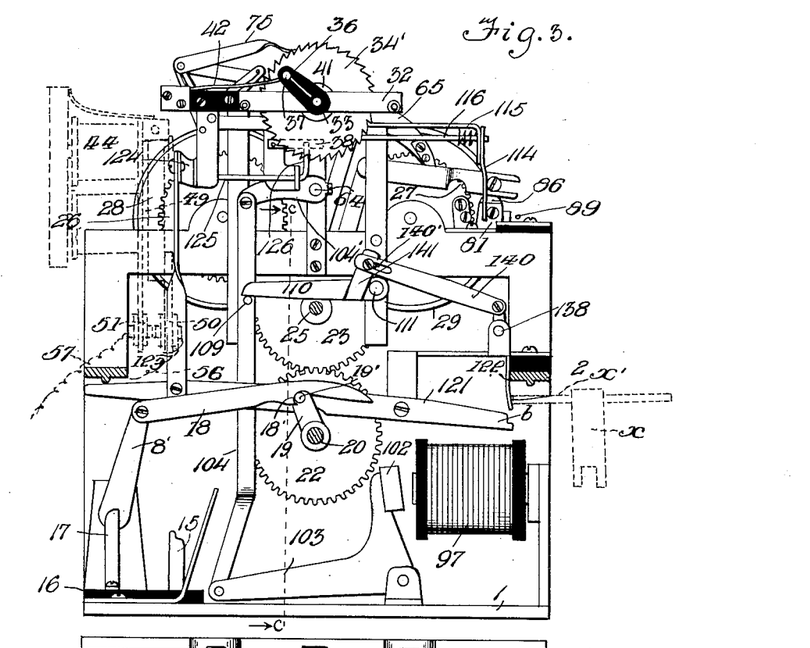
Fig. 3 is a section on line *a—a*, Fig. 2, looking in the direction of the arrows.
Figure 4:
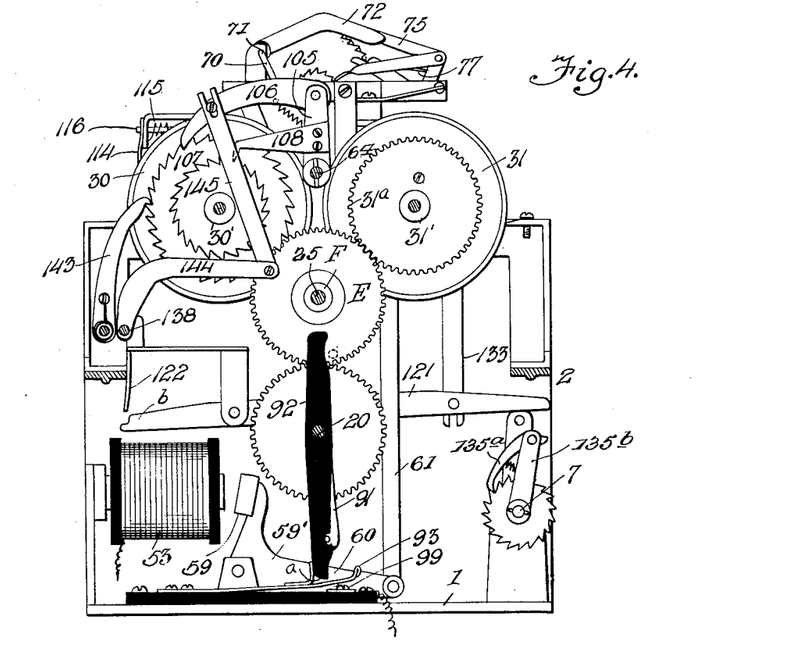
Fig. 4 is a similar view taken on line *b—b*, Fig. 2, looking in the direction of the arrows.
Figures 6, 17:
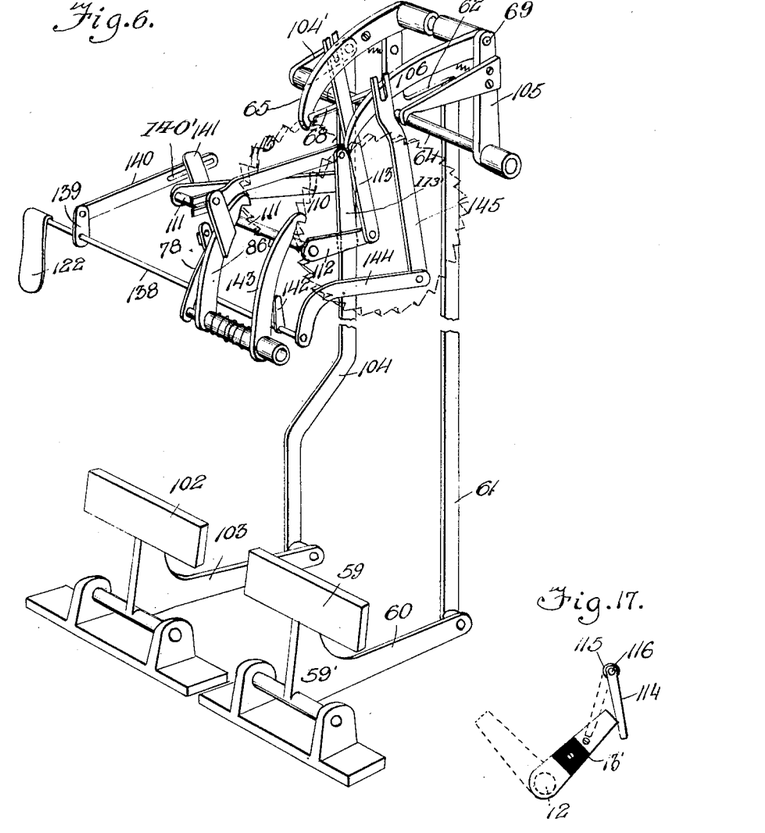
Fig. 6 is an enlarged perspective view of the mechanism for operating the type wheels, and for releasing the mechanisms.
Fig. 17 is a detail view illustrating the positions of the switch 13 when actuating said shift mechanism of the step-by-step device.
Figures 8, 9:
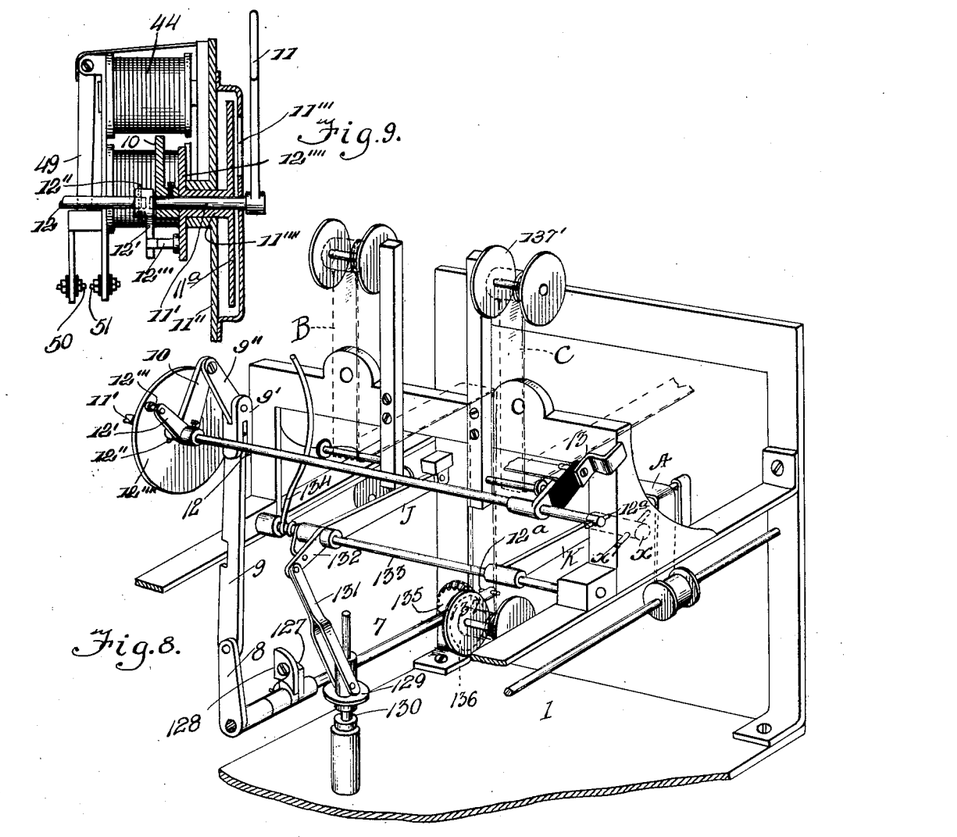
Fig. 8 is an enlarged perspective view, in skeleton, of the key-shaft, showing the signal operating mechanism, the paper feed, the circuit making mechanism, and the printing mechanism.
Fig. 9 is an enlarged detail section through the signal and its operating shaft and also the operating magnet 44, in elevation.
Figure 10:
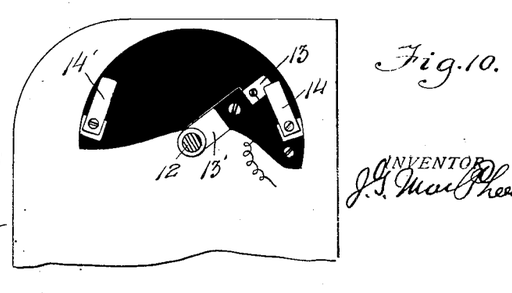
Fig. 10 is a detail view of the switch for closing the circuits for different rates.
Figures 11, 12, 13, 14, 15:
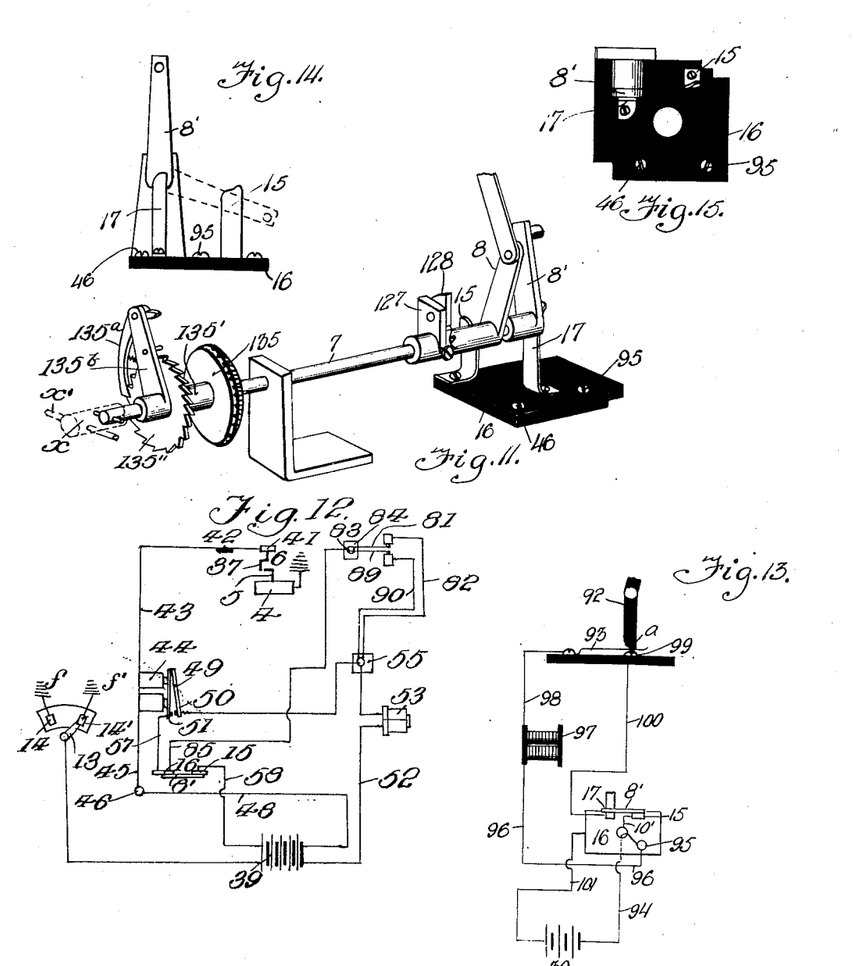
Fig. 11 is an enlarged detail perspective view of the key-shaft and its contiguous parts.
Fig. 12 is a diagrammatic view of the main actuating circuit and the cents' controlling circuit.
Fig. 13 is a diagrammatic view of the dollars' controlling circuit.
Figs. 14 and 15 are detail views of the block 16 of insulation which carries the main switch parts.
Figures 18, 19, 21:
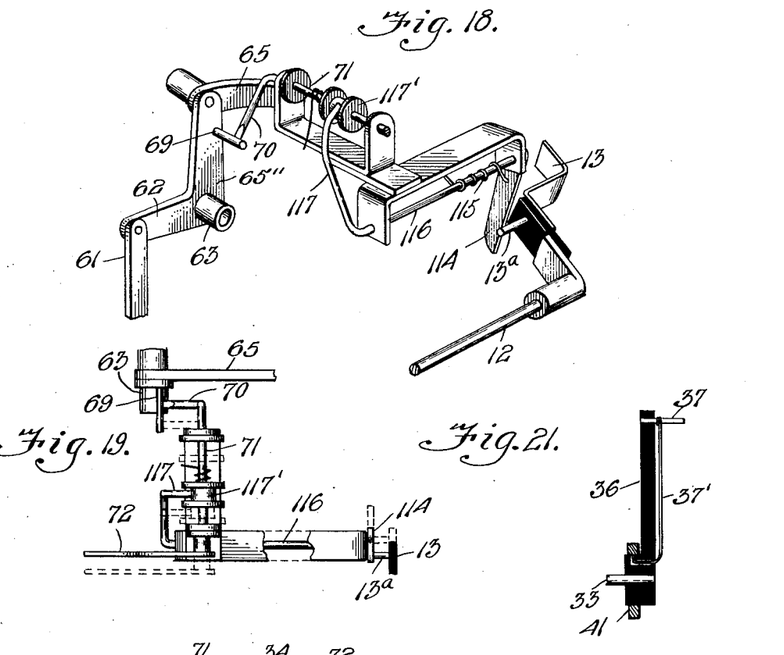
Fig. 18 is a view showing in perspective, the relative positions of the switch 13 and the shift mechanism of said step-by-step device.
Fig. 19 is a detail top plan view of the pawl 65, the step-by-step device and shifting mechanism, dotted lines showing the position for "running" rate.
Fig. 21 is a detail section of arm 36, showing its mode of connection with shaft 33 of the step-by-step device.
Figure 24:
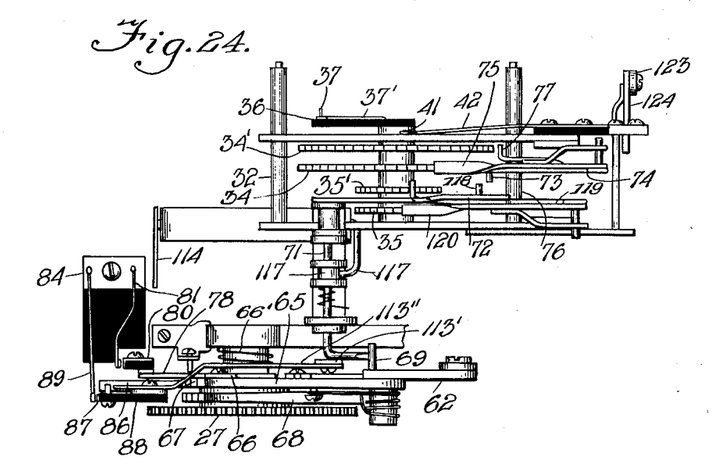
Fig. 24 is a top plan view of the step-by-step device showing the ratchets 66 and 67 and pawls 78 and 86.

In further describing my taximeter, the mode of operation will be simultaneously described, with the structural parts; and presuming that the vehicle is engaged, the chauffeur or driver, by means of the removable key X, operates the key-shaft 7, Figs. 4, 8, and 11, for "running" time rate. The key shaft being turned counter clockwise operates the crank 8 which in turn pulls the links 9 and 9', Fig. 8, and the crank 10 which is connected to the "for hire" signal 11, Fig. 9, through the mechanism of a short shaft 11' to which the crank 10 is connected rigidly by means of a set screw as shown, so that when the shaft 7 is turned it turns the "for hire" signal 11. The shaft 11' is rotatable independently of the shaft 12 as shown in Fig. 9, but coupled thereto by means of a coupling 12' having an arm 12'' rigid therewith, which is connected by a pin 12''' to a disk 12'''' which is rigid through a sleeve with a "waiting" disk 11ª, which is mounted within the casing 11'', Fig. 9, this casing being provided with a slot 11''', through which the disk may be seen, and the purpose of which will presently appear. When the "for hire" signal 11, is down, the vehicle is engaged. To operate the shaft 12, Fig. 8, the same key X is used and when said shaft is turned it operates the indicator disk 11ª, Fig. 9, through the coupling 12', arm 12'', pin 12''' and disk 12'''', said end 12ª, of shaft 12 being accessible from the exterior of the casing. The switch 13, Figs. 8 and 10, is rigid with the shaft 12 and normally in the position as shown in Figs. 10, 17 and 18, thus holding the "running" rate circuit closed, thus making it necessary for the switch 8' to be moved into contact with plates 15 and 17, Figs. 3, 11, and 14 to be closed to insure the operation of the mechanisms for recording, the switch 13 being employed to permit the mechanisms to be operated at two different rates for "running" or "waiting." To actuate the switch 13 for "waiting" rate, the key X, is connected at 12ª, and the shaft 12 turned shifting the switch 13, from contact plate 14, Fig. 10, to contact plate 14', this movement of the shaft 12, simultaneously moving the crank arm 12ᵇ, keyed upon the inner end of the shaft 12, which through pin 12'' and disk 12'''' will cause the signal disk 11ª to turn, so that the signal disk 11ª, will indicate through the slot 11''', that the mechanism is recording at "waiting" time rate. To shift to "running" time rate the shaft 12 is turned manually in the reverse direction, thus bringing the switch 13 and contact plate 14 into contact, this action simultaneously causing the pin 13ª, Figs. 17 and 18, to engage the arm 114, of the shifting mechanism, so that the shaft 116, will move its arm 117 and through the bushing 117', shift the shaft 71, Figs. 16 and 24, so that its finger 72, will have its operating end above the pin 73 of the arm 74, which operates the "running" time rate actuating pawl 75, of the step-by-step device, Fig. 16. The spring 115, Figs. 18 and 20, automatically shifts the shaft 71 to "waiting rate" when switch 13 is returned, so that its finger 72, is then above the pin 118 of the arm 119, of the "waiting" time rate mechanism.

Figure 1:
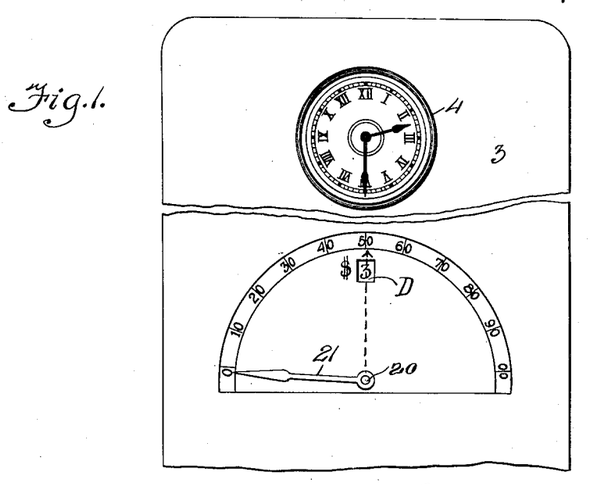
Figure 1 is a front elevation of the taximeter, partly broken away at its center.
Figure 2:
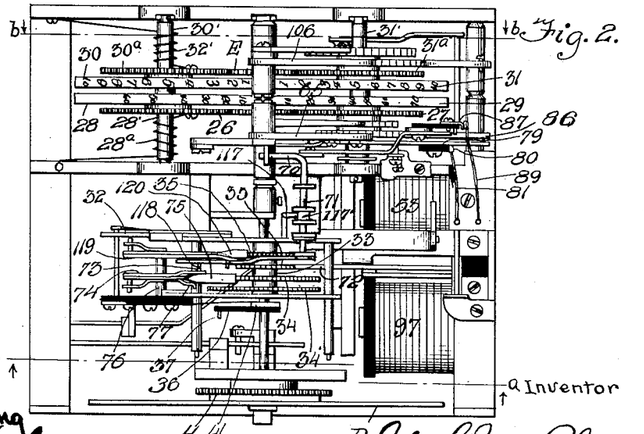
Fig. 2 is a top plan view of the mechanisms, the front of the casing with the clock and also a portion of one side of the casing being removed.
Figure 7:
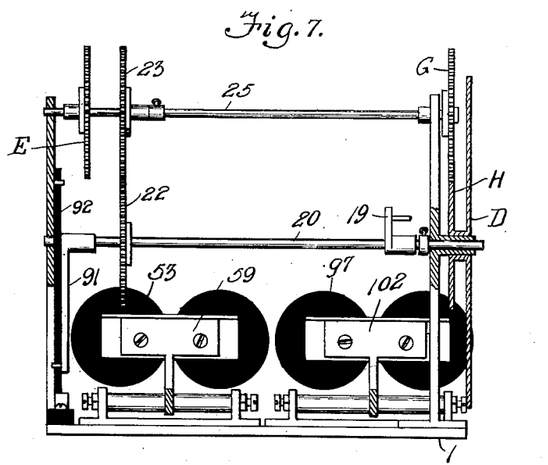
Fig. 7 is a section taken on line *c—c*, Fig. 3, looking in the direction of the arrows.
Figure 16:
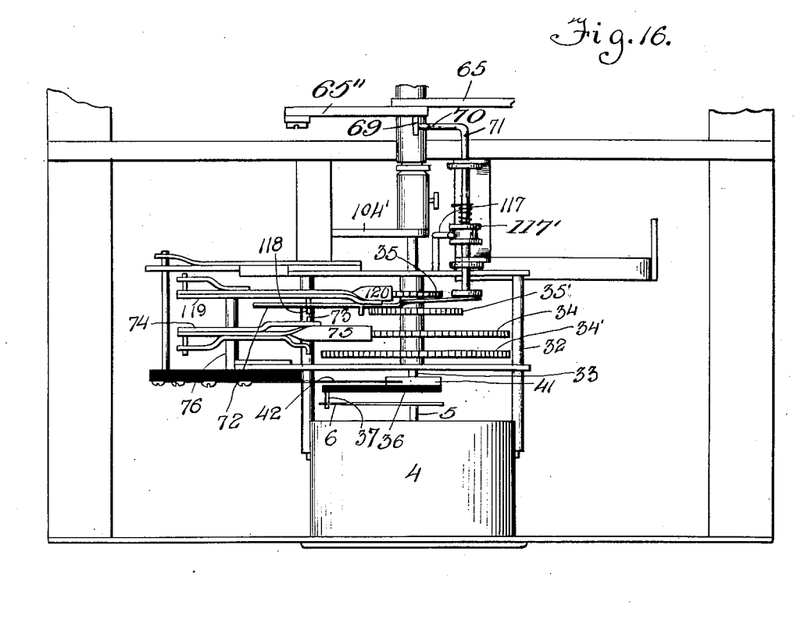
Fig. 16 is an enlarged top plan view of the clock, and the step-by-step device, dotted lines showing the position of the shaft for shifting the step-by-step device for either "running" or "waiting" rate.

As above stated, simultaneously with the movement of the key-shaft, the crank 8', Figs. 11 and 14 engages the contact plate 15, mounted upon the block 16 of insulation, so that the second step in the completion of the operating circuit is made, to be finally completed when the contact hand 6, Fig. 16 catches up to and engages the contact arm 37, carried by the arm 36, of insulation, the detail construction of which will be presently set forth. As the key-shaft is thus turned, the arm or pawl 18, pivoted upon the end of the crank 8', is moved toward the center of machine, (Fig. 3) and its kerf 18', engages the pin 19', of the arm 19, turning the main shaft 20, one-quarter of a revolution, causing the pointer 21, to indicate the initial fare, (dotted lines Fig. 1) of 50 cents. The rotation of the shaft 20 in this manner causes the gear 22, to operate the gear 23, loosely mounted upon the shaft 25, and as this gear 23, meshes with the two cents' type wheel gears 26 and 27, the two type wheels 28 and 29, are rotated, so that their 50 cent type are in printing position, that is above the typewriter ribbon A, and in a position to print upon the record tape B, and the coupon tape C, when desired. The dollar type wheels 30 and 31, are each mounted upon their respective sleeves 30' and 31', the sleeve 30', being provided with the coiled spring 32', having one terminal connected to the sleeve and the other to the frame of the machine. The sleeve 28', of the cent type wheel, is also provided with a spring 28ª, whereby when both sleeves 28' and 30', are released, these springs will automatically return their respective type wheels and also the dollar indicating disk D, and the pointer 21 to zero. The gears 30ª and 31ª, Fig. 2 mesh with the intermediate gear E, through the medium of which, the operation of the coupon tape printing gear 31ª, transmits motion to the gear 30ª, and also the auxiliary shaft 25, whose forward gear G, Fig. 7, operates the gear H, of the dollar indicating disk D, this action winding the spring 32'.

At the time of the operation of the initial fare, the dollar wheels are not affected, and only the cent wheels can possibly be manually operated, and then only to indicate a fare of 50 cents in this construction and adjustment. To operate the initial fare ratchet 66 Fig. 5, and not affect the indicating mechanisms until the contacts 6, Fig. 16, and 37 have engaged, in this particular instance, six successive times and the indicating mechanism has reached a fare beyond the initial rate, and also to operate the indicating mechanisms therebeyond, the electrical control through the contact hand 6 and the contact arm 37, are brought into play.

Figure 20:
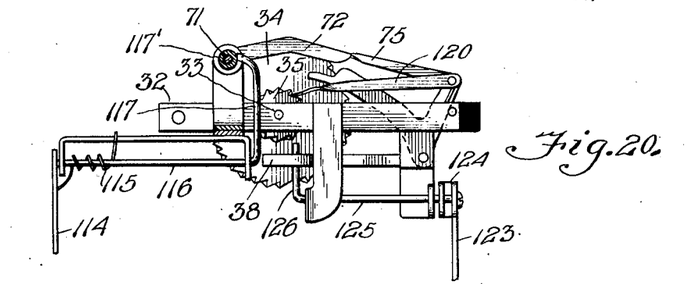
Fig. 20 is a rear elevation of the step-by-step device with the releasing mechanism for spring 38 and the shifting mechanism.

In the rear of the clock is a frame 32, carrying the rotatable shaft 33, this constituting the main portion of my step-by-step device, Figs. 2, 3, 16, 18, 19, 20 and 24, and this shaft 33 carries the large "running" rate ratchet wheels 34 and 34', and the two smaller "waiting" rate ratchet wheels 35 and 35', the teeth of the last being of the same size and pitch but of a lesser number. Upon the forward end of the shaft 33, is connected the arm 36, of insulation, which carries the contact arm 37, which is connected to the metal ring or wheel 41, Fig. 21, by means of the wire 37', the wheel 41 being insulated from but rotatable with the shaft 33. The contact arm is normally in the path of travel of the contact hand 6 of the minute hand arbor, and when not recording, this arm 36 is moved by and with the minute hand arbor, the contact hand 6, engaging the same and rotating it with the arbor, but however, to slightly retard the movement of the step-by-step device, so that it will not be moved too far, when a circuit is established by contact hand 6 and arm 37, the flat spring 38, Fig. 20, is permitted to bear against the rear face of the large ratchet wheel 34, the rocking shaft 125, as will later appear normally holding this spring from contact when the machine is not recording.

The main circuit which is closed or completed, when the contact hand 6 engages or catches up to the arm 37, (Fig. 12) is as follows:—ground $g$, at the clock, contact hand 6, contact arm 37, metal wheel 41, contact spring 42, carried by and insulated from the frame 32, wire 43, main actuating magnet 44, carried by one of the side walls of the main casing, wire 45, post 46, insulated from the frame by the block 16 of insulation, (not shown in Fig. 12, thus avoiding confusion) wire 48, the batteries 39, wire 40, switch 13, plate 14, and ground $f$, this constituting the circuit for "running" rate, while the circuit for "waiting" rate, is similar, except that the switch 13 is moved from engagement with contact plate 14 to contact 14', bringing in the ground $f'$. This circuit energizes the actuating magnet 44, Fig. 9, operating its armature 49, which closes the gap between the two insulated points 50 and 51, closing another circuit through the batteries 39, wire 52, the cent operating magnet 53, Fig. 4, the wire 54, Fig. 12, the insulated post 55, the wire 56, the point 50, the point 51, the wire 57, the plate 17, the crank 8', Fig. 3, the plate 15, the wire 58 and batteries 39. This energization of the magnet 53, Fig. 4, attracts or operates the armature 59, which operates its pivoted crank 59', raising the lever 60, and the link 61, which in turn raises the lever 62, Fig. 5, of the sleeve 63, journaled upon the shaft 64, which shaft 64 is journaled in the upper frame work of the machine near and intermediate of both sets of type wheels. As the sleeve 63 carries the pawl 65, the said pawl 65 is moved to the right in Fig. 5 having its pivoted end dipped and engaged with the loosely journaled initial fare ratchet 66, which is thus moved against the tension of its spring 66', Fig. 24, and held against slipping by means of the pawl or detent 78. As clearly shown in Fig. 5, the teeth of the ratchet 66, project beyond the teeth of the ratchet 67, so that as long as the teeth of the ratchet 66 are in position for engagement with the pawl 65, the ratchet 67 is not actuated, but in this instance, when the ratchet 66 has been moved until its smooth surface $x$, is engaged by the pawl 65, and the pawl 78 holds the ratchet 66 in this position, the machine having now recorded up to the amount of the initial fare (50 cents), the pawl 66 will now at each energization of the magnet 53, operate the ratchet 67, which is keyed to the sleeve 28', so that the cent gears and type wheels will be operated and cause the pointer 21 to indicate the fare up to 00, at which time the dollar registering and indicating mechanism are operated, as will presently appear. To prevent the pawl 65, moving the ratchet 67 too far, I employ the arresting ratchet 68', which is also carried by the sleeve 28', this being acted upon by the spring arm 68.

Simultaneously with the movement of the pawl 65, Figs. 4, 5, 16, 18 and 24, the pin 69, carried by the arm 65'' of pawl 65, engages the arm 70, rocking the shaft 71, and causing the finger 72, carried upon the front end of the shaft 71, to dip and engage the pin 73, of the arm 74, of the "running" rate actuating pawl 75, which is journaled upon the shaft 76, mounted in the frame 32. The pawl 75, is thus pushed downwardly and engages the teeth of the ratchet 34, moving the ratchet one tooth, while the arresting pawl 77, Fig. 24, engages the teeth of the ratchet 34', and thus insures the proper movement of the shaft 33 and its arm 37. By this means the arm 37, Fig. 16, is moved the distance of one tooth, and thus separated from the contact hand 6, the desired distance, such distance or separation being such that it will require a certain predetermined lapse of time to again bring the contact hand 6, into engagement with the contact arm 37, thus insuring the operating of the electrical circuits only for an instant.

Figure 5:
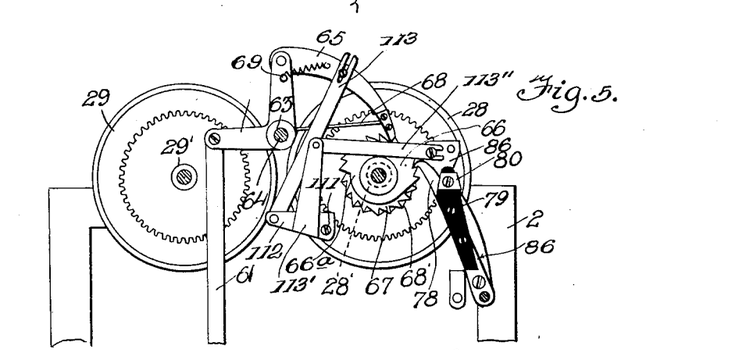
Fig. 5 is a detail view of the final circuit making mechanism and the mechanism for operating the initial fare ratchet, and the cents' coupon printing type wheel operating mechanism.

To insure the proper operation of the mechanisms, should the separation of the contact arm 37 and hand 6, occur too soon or too rapid, the pawl 65, in moving away from the center of the machine and at its fullest stroke, the initial fare ratchet 66 not having been moved so that the pawl 65 will act upon ratchet 67, another circuit is formed and includes the magnet 53. This is accomplished, when the initial fare ratchet 66, is in the position as shown in Fig. 5, so that as the pawl 65, moves the ratchet 66, the teeth of the said ratchet 66, will raise or move the pawl 78, and as this pawl 78 carries the block 79 of insulation, and the metal contact plate 80, the plate 80, will engage the spring arm 81, closing a circuit, Fig. 12, as follows:—batteries 39, the wire 52, the magnet 53, the wire 54, the post 55, the wire 82, the plate 80, the arm 81, the metal plate 83, carried by the block 84 of insulation, and thus insulated from the machine, the wire 85, the plate 17, the crank 8', the plate 15, the wire 58, and the batteries 39, this circuit being completed just after the magnet 44 has been deënergized, and the wires 56 and 57 and points 50 and 51, have been cut out.

After the initial fare ratchet 66 has been moved to permit the pawl 65 to engage the ratchet 67, the teeth of the said ratchet 67 in being moved by the pawl 65, will raise the holding pawl 86 of the ratchet 67, and cause a circuit to be made that operates exactly as the circuit just described as being made by pawl 78, except that the plate 80 is cut out. This circuit is as follows:—the plate 87, Fig. 12, insulated from the pawl 86, Fig. 24, by means of the block 88, spring arm 89, the plate 83, the wire 85, the plate 17, crank 8', the plate 15, the wire 58, the batteries 39, the wire 52, the magnet 53, the wire 54, the post 55, the wire 90, and the plate 87. These circuits formed by the plates 80 and 87, respectively, cause the second energization of the magnet 53, and thus insure the complete or continued operation of the various mechanisms, the circuits made by the said plates 80 and 87, being broken just as soon as the pawls 78 and 86, respectively, are seated between the teeth of the respective ratchets 66 and 67. The movement of the pawl 65, thus operates the cent type wheels, and through the gear 26 Fig. 3, operates the gear 23 and the shaft 20, which as it rotates carries the arm 91, Figs. 4 and 13. When the shaft 20 has completed, in this instance, one-half of a revolution, this arm 91 is moved so that it engages the upper portion of the pivoted lever 92, made of insulation, and causes its lower end a, thereof to engage and depress the spring plate 93. This action closes a circuit (Fig. 13), through the batteries 39, the wire 94, the post 95, the wire 96, the dollar magnet 97, the wire 98, the plate 93, the point 99, the wire 100, the plate 17, the crank 8', the plate 15, the wire 101, and the batteries 39. This energization of the magnet 97, attracts the armature 102 Fig. 3, lifting the arm 103, the link 104, and the crank 104', thus rocking the shaft or rod 64 Fig. 4, and pushing the arm 105 and pawl 106. The pawl 106 is thus pushed upon the ratchet 107, and moves the dollar type wheels, the arm 105, also operating the arresting pawl 108. As the link 104, is raised, its pin 109, engages the end of the pivoted bar, 110, rocking the shaft 111, and moving the arm 112, the link 113, and the pawl 65, and also the bar 113', link 113'', and pawl 86, so that as the pawls 86 and 65 are disengaged from the ratchet 67, the cent type wheels and pointer 21 are automatically by reason of its spring, returned to zero, the dollar disk and type wheels at this time indicating one dollar.

Should it be desired to operate the mechanisms at "waiting" rate, the shaft 12 is turned manually by the key X, so that the switch 13 disengages the contact 14 and engages the contact 14', and simultaneously with this action the disk 11ª, indicates "waiting" rate. In moving the switch 13 from 14 to 14', the pin 13ª, Fig. 18, is released from the arm 114, permitting the spring 115, to automatically operate the shaft 116, and cause the arm 117, to shift the shaft 71, so that its finger 72, Fig. 16, assumes the position as shown in this figure, or directly above the pin 118 of the arm 119, carrying the "waiting" rate actuating pawl 120, which thus when the magnet 44 is energized, and the magnet 53 is energized is actuated by the pawl 65, similarly to the pawl 74, the ratchet 35 of the step-by-step device being operated to separate the arm 37 a greater distance from the contact hand 6, than it would during the operation of the ratchet 34. In the present instance the mechanisms are operated fifteen times per hour for "waiting" rate and forty times per hour for "running" rate.

When it is desired to record the amount of the ride, or the amount paid by the passenger, the operator, turns the key-shaft 7, so that the "for hire" signal is returned to upright position, and the crank 8', is released from the contact plate 15, thus permanently opening the circuit and preventing any electrical operation of the mechanisms. This movement of the key-shaft causes the crank 8', (Figs. 3 and 11) to engage the free end of the long lever 121, dipping its short end $b$ so as to unlock the plate 122. The movement of the key-shaft in the opposite direction, raises the short end $b$, and prevents the plate 122 from being moved inwardly. When the short end $b$, is dipped, the link 123 Fig. 3 is raised, as is also the crank 124, this action rocking the shaft 125, Fig. 20, and causing the arm 126 to engage the flat spring 38, and move its free end from engagement with the rear face of the ratchet 34, thus permitting the shaft 33 and its arm 37 to rotate freely with the contact hand 6 and the minute hand arbor. The reverse action of the link 123, pulls the crank, and actuates the rock shaft 125 so that the spring 38 is permitted of its own tension to engage, as a slight brake, the rear face of the ratchet 34, whereby the shaft 33 is prevented from rotation that may be occasioned by jars and a too quick actuation of the pawls 74 and 119.

Figures 22, 23:
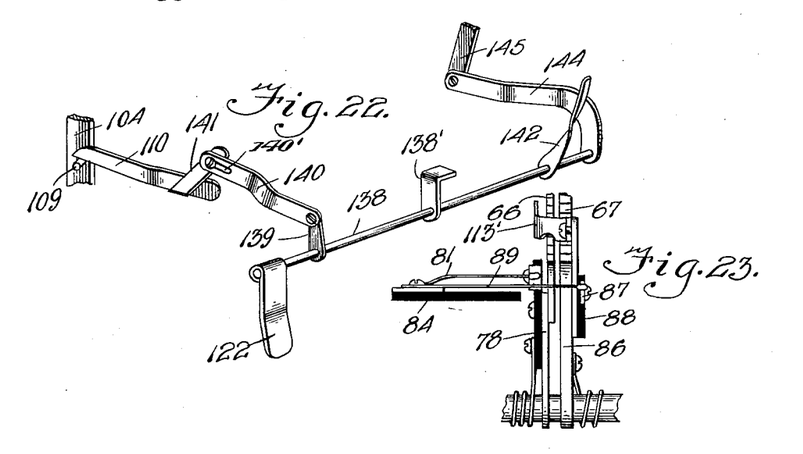
Fig. 22 is a front perspective view of the manually operated mechanism for releasing the various pawls and ratchets to return the indicating mechanism to zero.
Fig. 23 is a detail view of pawls 78 and 86 in operative position with the ratchets 66 and 67.

In the movement of the key-shaft, the arm 127 Fig. 9, carrying the catch 128, causes its catch to engage the collar 129, carried slidably upon the vertical rod 130, this action lifting the link 131, and the crank 132, which rocks the shaft 133, and pulls the two platens J and K, away from the type wheels; and as soon as the catch releases the collar 129, the spring 134, quickly snaps the platens up against the ribbon, record and coupon tapes and type wheels, so that the impression of the type is conveyed from the ribbon to the tapes, and the amount of the ride is printed upon the record and coupon tapes simultaneously. The printed coupon is then pulled manually from the rear of the machine by the chauffeur, and handed to the passenger, who upon ascertaining that the amount printed thereon tallies with the amount indicated by the disk D and pointer 21, pays the fare and retains the coupon as a receipt. The chauffeur now inserts one of the pins $x'$ of the key X, (Fig. 3) through an opening in the casing opposed to the plate 122, and pushes said plate 122, which in turn rocks the shaft 138, Fig. 22 causing the arm 139 to move the link 140, the distance of the length of the slot 140,' Figs. 6 and 22, before pulling the short lever 141, connected rigidly to the bar 110, rocking the shaft 111, raising the short lever 112, the link 113, which in turns raises and releases the pawl 65 from the ratchet 67, the bar 113', connected to the lever 112, simultaneously pushing the link 113'', and pushing the pawl 86 from engagement with the ratchet 67, thus entirely releasing the cent type wheels so that they return to zero. Simultaneously with this action, the shaft 138, causes its rigid finger 138' Fig. 22, to push the ratchet 78 Fig. 6 from engagement with the ratchet 66, so that the said initial rate ratchet 66 is, by reason of its spring, returned so that its teeth will prevent the pawl 65 from engaging ratchet 67, the releasing of the pawl 78 being at all times manual and not automatic, as is the pawl 86, when the dollar pawl is operated. The pawl 106 Fig. 6 and its holding ratchet 143, are also released by the shaft 138 and at the same time as the pawls 65, 86 and 78, it being done through the curved lever 144, link 145, which raises the pawl 106 from engagement with the dollar ratchet, while the finger 142 raises the holding pawl 143 from the engagement with the dollar ratchet, thus permitting all the type wheels, the disk D and pointer 21 to return to zero, the machine now being ready for the next passenger. By slotting the link 140, as at 140', Fig. 6, the arm 110, can be moved upon the closure of the circuit for operating the dollar indicator and thus reset the cent indicator to zero, without affecting the initial fare ratchet or the dollar wheel retaining pawl, the lever 141 being permitted a movement the length of the slot 140', without affecting the link 140.

To feed the record tape, I provide a sleeve 135', which is loosely mounted upon the key-shaft 7, Figs. 4, 8 and 11, and carries the bevel gear 135, which is at all times in mesh with the gear 136 Fig. 9 carried by the lower record tape spool 137. Upon the other end of the sleeve 135', is a toothed ratchet 135'' Fig. 11, which is adapted as the key-shaft 7, is turned to close the switch 8', at 15 and 17, to be engaged by the spring pawl 135$^a$, carried by the arm 135$^b$, which is keyed to the key-shaft 7, and rotated so that the tape is pulled from the upper spool 137' upon the lower spool 137.

What I claim, as new, is:—

1. In an operating device, a plurality of intermittently engaging rotating contacts, means for rotating said contacts, one of said contacts being advanced a predetermined amount on each engagement of said contacts.

2. In an operating device, a plurality of rotating contacts, independent means for rotating each of said contacts, one of said contacts being advanced a predetermined amount on each engagement of said contacts.

3. In an operating device, a pair of intermittently engaging rotating contacts, a mechanical motor for operating one of said contacts and an electric motor for operating the other of said contacts, one of said contacts being advanced a predetermined amount on each engagement of said contacts.

4. In combination, a register and means for operating said register comprising a pair of intermittently engaging rotating contacts and means for rotating said contacts, one of said contacts and said register being advanced a predetermined amount on each engagement of said contacts.

5. In combination, a register and means for operating said register, comprising a pair of intermittently engaging rotating contacts, independent means for operating each of said contacts, one of said contacts and said register being advanced a predetermined amount on each engagement of said contacts.

6. In combination, a register and means for operating said register, comprising a pair of intermittently engaging rotating contacts, and means for rotating said contacts, one of said contacts rotating continuously, the other of said contacts rotating intermittently, and one of said contacts and said register being advanced a predetermined amount on each engagement of said contacts.

7. In combination, a register and means for operating said register, comprising a pair of intermittently engaging rotating contacts, a spring motor for operating one of said contacts, and an electro motor for operating the other of said contacts, one of said contacts and said register being advanced a predetermined amount on each engagement of said contacts.

8. In combination, a register and means for operating said register, comprising a pair of intermittently engaging rotating contacts, a spring motor for advancing one of said contacts continuously, and an electro motor for advancing the other of said contacts intermittently, one of said contacts and said register being advanced a predetermined amount on each engagement of said contacts.

9. In combination, a register and means for operating said register, comprising a pair of intermittently engaging rotating contacts, means for rotating said contacts, one of said contacts and said register being advanced a predetermined amount at each engagement of said contacts, and means coöperating with one of said contacts for varying the amount of advance of said register on the engagement of said contacts.

10. In combination, a register and means for operating said register, comprising a pair of intermittently engaging rotating contacts, a motor for operating one of said contacts and an electromagnet for operating the other of said contacts, a circuit for said electro magnet, a second electromagnet for closing said circuit on each engagement of said contacts, one of said contacts and said register being advanced a predetermined amount on each operation of said register.

11. As means for operating a register at variable rates, an electromagnet, a shaft, a plurality of ratchets having a different number of teeth fixed on said shaft, pawls coöperating with said ratchets, selective means for said pawls, and means for actuating a selected pawl by said electromagnet.

12. In a taximeter, the combination with a clock, and an indicating mechanism, of means in operative relation with said clock for operating said mechanism through the medium of the minute hand arbor of the clock, comprising a source of electrical energy, a circuit connecting said source with said mechanism, a contact carried by and rotatable with the minute hand arbor of the clock, another contact disposed in the path of rotation of the minute hand arbor's contact, and means for separating the last mentioned contact from the minute hand arbor's contact after the minute hand arbor's contact has caught up to and engaged said last mentioned contact.

13. In a taximeter, the combination with a clock, mechanism for registering the fare, mechanism for printing a receipt of the fare paid by the passenger, and mechanism for making a permanent record of cash received, of means in operative relation with said clock for operating said mechanisms through the medium of the minute hand arbor of the clock, comprising a source of electrical energy, a circuit connecting said source with said mechanisms, a contact carried by and rotatable with the minute hand arbor of the clock, another contact disposed in the path of rotation of the minute hand arbor's contact, and means for separating the last mentioned contact from the minute hand arbor's contact after the minute hand arbor's contact has caught up to and engaged said last mentioned contact.

14. In a taximeter, the combination with a clock, and an indicating mechanism, of means in operative relation with said clock for operating said mechanism at two different rates, comprising a source of electrical energy, circuits connecting said source with said mechanism, a contact carried by and rotatable with the minute hand arbor of the clock, another contact disposed in the path of rotation of the minute hand arbor's contact, means for separating the last mentioned contact from the contact of the minute hand arbor after the minute hand arbor's contact has caught up to and engaged said last mentioned contact, and means for changing the periods between the engagements of said minute hand arbor contact and the other contact.

15. In a taximeter, the combination with a clock, mechanism for registering the fare, mechanism for printing a receipt of the fare paid by the passenger, and mechanism for making a permanent record of cash received, of means in operative relation with said clock for operating said mechanisms at two different rates, comprising a source of electrical energy, circuits connecting said source with said mechanisms, a contact carried by and rotatable with the minute hand arbor of the clock, another contact disposed in the path of rotation of the minute hand arbor's contact, means for separating the last mentioned contact from the minute hand arbor's contact after the minute hand arbor's contact has caught up to and engaged the last mentioned contact, and means for changing the periods between the engagements of said minute hand arbor contact and the contact disposed in its path.

16. In a taximeter, the combination with a clock, and an indicating mechanism, of means in operative relation with said clock for operating said mechanism at two different rates, comprising a source of electrical energy, circuits connecting said source with said mechanism, a contact carried by and rotatable with the minute hand arbor of the clock, another contact disposed in the path of rotation of the minute hand arbor's contact, means for separating the last mentioned contact from the minute hand arbor's contact after the minute hand arbor's contact has caught up to and engaged the last mentioned contact, means for regulating the distance of such separation, and means for operating said distance regulator so that the contacts engage at different periods of time.

17. In a taximeter, the combination with a clock, mechanism for registering the fare, mechanism for printing a receipt of the fare paid by the passenger, and mechanism for making a permanent record of cash received, of means in operative relation with said clock for operating said mechanisms at two different rates, comprising a source of electrical energy, circuits connecting said source with said mechanisms, a contact carried by and rotatable with the minute hand arbor of the clock, another contact disposed in the path of rotation of the minute hand arbor's contact, means for separating the last mentioned contact from the minute hand arbor's contact after the minute hand arbor's contact has caught up and engaged the last mentioned contact, means for regulating the distance of such separation, and means for operating said distance regulator so that the contacts engage at different periods of time.

18. In a taximeter, the combination with a clock, and an indicating mechanism, of means in operative relation with said clock for operating said mechanism at two different rates, comprising a source of electrical energy, circuits connecting said source with said mechanism, a contact carried by and rotatable with the minute hand arbor of the clock, a shaft journaled substantially in line with said minute hand arbor, a contact arm carried thereby and adapted to rotate in the same path as the contact of the minute hand arbor, a circuit being formed when said arbor's contact and the shaft's arm engage, means operated by such engagement of the contact and arm to rotate the shaft and jump the arm a predetermined distance away from the arbor's contact, and means whereby the arm is jumped a greater or lesser distance to operate the indicating mechanism at two different rates.

19. In a taximeter, the combination with a clock, mechanism for registering the fare, mechanism for printing a receipt of the fare paid by the passenger, and mechanism for making a permanent record of cash received, of means in operative relation with said clock for operating said mechanisms at two different rates, comprising a source of electrical energy, circuits connecting said source with said mechanisms, a contact carried by and rotatable with the minute hand arbor of the clock, a shaft journaled in line with said minute hand arbor, a contact arm carried thereby in the same path as the contact of the arbor, said contact of the arbor being adapted to catch up to and engage said contact arm to complete a circuit to operate the mechanisms, means operated by such contact of the arbor contact and arm to rotate the shaft and jump the arm a predetermined distance away from the arbor's contact, and means whereby the arm is jumped a greater or lesser distance to operate the mechanisms at two different rates.

20. In a taximeter, the combination with a clock, and an indicating mechanism, of means in operative relation with said clock for operating said mechanism at two different rates, comprising a source of electrical energy, circuits connecting said source with said mechanism, a contact carried by and rotatable with the minute hand arbor of the clock, a shaft journaled substantially in line with said minute hand arbor, a contact arm carried by said shaft in the same path as the arbor's contact, said arbor's contact being adapted to catch up to and engage said contact arm to complete a circuit to operate the mechanism, means mounted upon the shaft to operate the shaft to jump the arm away from the arbor's contact and to regulate the distance of such jump, and means to cause the said shaft to be moved two different distances, one at a time, whereby the indicating mechanism is operated at two different rates.

21. In a taximeter, the combination with a clock, mechanism for registering the fare, mechanism for printing a receipt of the fare paid by the passenger, and mechanism for making a permanent record of cash received, of means in operative relation with said clock for operating said mechanisms at two different rates, comprising a source of electrical energy, circuits connecting said source with said mechanisms, a contact carried by and rotatable with the minute hand arbor of the clock, a shaft journaled substantially in line with said minute hand arbor, a contact arm carried thereby in the same path as the contact of the arbor, said arbor's contact being adapted to catch up to and engage said contact arm to complete a circuit to operate the mechanisms, means mounted upon the shaft to operate the shaft and separate the contact arm from the arbor's contact a predetermined distance, and means to cause the said shaft to be moved two different distances, one at a time, whereby the indicating mechanisms are operated at two different rates.

22. In a taximeter, the combination with a clock, and an indicating mechanism, of means in operative relation with said clock for operating said mechanism at two different rates, comprising a source of electrical energy, circuits connecting said source with said mechanism, a contact carried by and rotatable with the minute hand arbor of the clock, a shaft journaled substantially in line with said minute hand arbor, a contact arm carried thereby in the same path as the contact of the arbor, said arbor's contact being adapted to catch up to and engage said contact arm to complete a circuit to operate the mechanism, ratchet wheels, one of lesser diameter than the other journaled on said shaft, and means for actuating one of the ratchet wheels at a time to operate said shaft at each engagement of the arbor's contact and the shaft's contact arm to rotate the shaft and separate the contact arm from the arbor's contact a predetermined distance, dependent upon which ratchet wheel is actuated.

23. In a taximeter, the combination with a clock, mechanism for registering the fare, mechanism for printing a receipt of the fare paid by the passenger, and mechanism for making a permanent record of cash received, of means in operative relation with said clock for operating said mechanisms at two different rates, comprising a source of electrical energy, circuits connecting said source with said mechanisms, a contact carried by and rotatable with the minute hand arbor of the clock, a shaft journaled substantially in line with the minute hand arbor, a contact arm carried by the shaft in the same path as the arbor's contact, said arbor's contact being adapted to catch up to and engage said contact arm to complete a circuit to operate said mechanisms, ratchet wheels, one of a greater diameter than the other, journaled on said shaft, and means for actuating one of the ratchet wheels at a time to operate said shaft at each engagement of the arbor's contact and shaft's arm to rotate the shaft and separate the shaft's arm from the arbor's contact a predetermined distance dependent upon which ratchet wheel is actuated.

24. In a taximeter, the combination with a clock, and an indicating mechanism, of means in operative relation with said clock for operating said mechanism at two different rates, comprising a source of electrical energy, a circuit connecting said source with said mechanism, a contact carried by and rotatable with the minute hand arbor of the clock, another contact disposed in the path of rotation of the arbor's contact, means for separating the last mentioned contact from the arbor's contact just after the said contacts have engaged and the indicating mechanism has been operated, and means, whereby the distance of such separations may be made shorter or longer to cause the indicating mechanism to be operated at one or the other of the rates.

25. In a taximeter, the combination with a clock, and an indicating mechanism, of means in operative relation with said clock for operating said mechanism at two different rates, comprising a source of electrical energy, a circuit connecting said source with said mechanism, a contact carried by and rotatable with the minute hand arbor of the clock, another contact disposed in the path of rotation of the arbor's contact, both contacts being in said circuit and adapted to engage to close the circuit to operate the mechanism, means operated simultaneously with the operation of the indicating mechanism to separate the said contacts a predetermined distance, and means, whereby the distance of such separations may be made shorter or longer to cause the indicating mechanism to be operated at one or the other of the rates.

26. In a taximeter, the combination with a clock, a main shaft, and an indicating mechanism operably connected with said main shaft, of means in operative relation with the clock for operating the main shaft and the mechanism at two different rates, comprising a source of electrical energy, a circuit connecting said source with said main shaft and indicating mechanism, a contact carried by and rotatable with the minute hand arbor of the clock, another contact disposed in the path of rotation of the arbor's contact, both contacts being in circuit and adapted to engage to close the circuit to operate the main shaft and indicating mechanism, means operated simultaneously with the operation of the main shaft and indicating mechanism to separate the contacts a predetermined distance, and means, whereby said last mentioned means is operated at two different rates of time to thereby actuate the main shaft and indicating mechanism at two different rates.

27. In a taximeter, the combination with a clock, and an indicating mechanism, of means in operative relation with said clock for operating said indicating mechanism, comprising a source of electrical energy, a circuit connecting said source with said mechanism, a contact carried by and rotatable with the minute hand arbor of the clock, another contact disposed in the path of rotation of the arbor's contact, both contacts being in said circuit and adapted to engage to close the circuit to operate the mechanism, and means operated simultaneously with the operation of the indicating mechanism to separate said contacts a predetermined distance.

28. In a taximeter, the combination with a clock, mechanism for registering the fare, mechanism for printing a receipt of the fare paid by the passenger, and mechanism for making a permanent record of the cash received, of means in operative relation with said clock for operating said mechanisms, comprising a source of electrical energy, a circuit connecting said source with said mechanisms, a contact carried by and rotatable with the minute hand arbor of the clock, another contact disposed in the path of rotation of the arbor's contact, both contacts being in said circuit and adapted to engage to close the circuit to operate the mechanisms, and means operated simultaneously with the operation of said mechanisms to separate said contacts a predetermined distance.

29. In a taximeter, the combination with a clock, a main shaft, and an indicating mechanism operably connected with said main shaft, of means in operative relation with the clock for operating the main shaft and indicating mechanism, comprising a source of electrical energy, a circuit connecting said source with said main shaft and mechanism, a contact carried by and rotatable with the minute hand arbor of the clock, another contact disposed in the path of rotation of the arbor's contact, both contacts being in circuit and adapted to engage to close the circuit to operate the main shaft and indicating mechanism, and means operated simultaneously with the operation of the main shaft and indicating mechanism to separate the contacts a predetermined distance.

30. In a taximeter, the combination with a clock, a main shaft, a key-shaft, means connected to the key-shaft and main shaft for operating the main shaft, and an indicating mechanism operably connected to the main shaft, of means in operative relation with the clock for operating the main shaft and the indicating mechanism, comprising a source of electrical energy, a circuit connecting said source with said main shaft, a contact carried by and rotatable with the minute hand arbor of the clock, another contact disposed in the path of rotation of the arbor's contact, both contacts being in said circuit and adapted to engage to close the circuit to operate the main shaft, means carried by the key-shaft whereby when the key-shaft is operated a circuit is established to be completed when the contacts engage, said operation of the key-shaft operating the main shaft to cause the indicating mechanism to indicate an initial fare, and means, operated simultaneously with the operation of the main shaft and indicating mechanism when the contacts engage to close the circuit, to separate the contacts and open the circuit.

In testimony whereof I affix my signature in presence of two witnesses.

JOHN G. MacPHERSON.

Witnesses:
BERNARD RUCKDESCHEL,
DAVID C. MOORE.